United States Patent Office 3,775,385
Patented Nov. 27, 1973

3,775,385
METHOD OF IMPARTING AN ANAEROBIC CURABLE CHARACTERISTIC TO POLYMERIZABLE MONOMERS
Masayoshi Ozono and Masakatsu Suzuki, Tokyo, Japan, assignors to Three Bond Co., Ltd., Tokyo, Japan
No Drawing. Filed Aug. 25, 1971, Ser. No. 175,002
Claims priority, application Japan, May 10, 1971, 46/30,969
Int. Cl. C08g 23/00
U.S. Cl. 260—79     25 Claims

ABSTRACT OF THE DISCLOSURE

A method of imparting an anaerobic curable characteristic to polymerizable monomers, which comprises adding 0.01–4.0 parts by weight of ortho-sulfo benzoic acid imide and 0.01–10.0 parts by weight of mercaptans to 100 parts by weight of specific polymerizable monomers.

According to the invention, the monomers are treated to have an excellent anaerobic curable characteristic; that is, to have a rapid anaerobic curing property, an excellent sticking property, and an excellent storage stability.

BACKGROUND OF THE INVENTION

This invention relates to a method of imparting an excellent anaerobic curable characteristic to polymerizable monomers (hereinafter referred to as "monomers").

The term "treated monomers" means monomers treated to impart an anaerobic curable characteristic.

Furthermore, the term "an excellent anaerobic curable characteristic" means a characteristic such that the treated monomers maintain liquid state in air or oxygen for long periods (over six months) without gelation (this means excellent storage stabilization) while rapidly curing upon exclusion of air or oxygen with excellent sticking property.

Therefore, the treated monomers having the excellent anerobic curable characteristic are utilized for sealants or adhesives of joints.

Various prior art methods for imparting an anaerobic curable characteristic to monomers, which comprising adding peroxides such as hydroperoxides to the monomers, are well known.

However, the treated monomers obtained by said well known methods are not satisfactory for utilizing them as sealants, because the well-known methods cannot impart the excellent anaerobic curable characteristic to the monomers; that is, said treated monomers do not have an excellent anaerobic curable characteristic. More particularly, the anaerobic curing velocity of the treated monomers is slow, and sticking property and the storage stability thereof are inferior.

SUMMARY OF THE INVENTION

It is a general object of the present invention to provide a method of imparting an excellent anaerobic curable characteristic to monomers without using peroxides, such as hydroperoxides.

More specifically, it is an object of the present invention to provide a method of imparting a rapidly anaerobic curable property to the monomers.

It is another object of the present invention to provide an excellent sticking property to the monomers.

It is still another object of the present invention to provide an excellent storage stability to the monomers.

The aforementioned objects are accomplished, according to the present invention, by providing a method of imparting an anaerobic curable characteristic to the monomers, which comprises adding 0.01–4.0 parts by weight of ortho-sulfo benzoic acid imide and 0.01–10.0 parts by weight of mercaptans to 100 parts by weight of monomers having the following general formula:

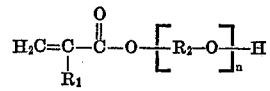

in which $R_1$ represents hydrogen or methyl radical, $R_2$ represents ethylene, propylene, or butylene radicals, and $n$ represents an integer of 1–10, or the following general formula:

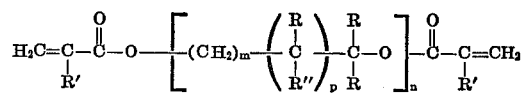

in which R represents hydrogen, —$CH_3$, —$C_2H_5$, —$CH_2OH$ or —$CH_2$

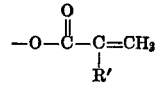

$R'$ represents hydrogen, chlorine, methyl or ethyl radicals, $R''$ represents hydrogen, —OH, or

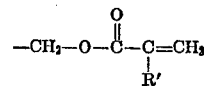

$m$ represents an integer of 1–8, $n$ represents an integer of 1–20, and $p$ represents 0 or 1.

DETAILED DESCRIPTION OF THE INVENTION

The inventors have found, as a result of their experiment, that it is possible to impart an excellent anaerobic curable characteristic; that is, a rapidly anaerobic curable property, a highly sticking property, and an excellent storage stability to monomers, only by adding the above-defined amounts of ortho-sulfo benzoic acid imide and mercaptans to the above-defined amounts of the monomers.

The monomers having the general formula of

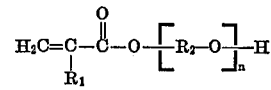

used in the present invention in which $R_1$ represents hydrogen or methyl radical, $R_2$ represents ethylene, propylene, or butylene radicals, and $n$ represents an integer of 1–10, are mono-acrylates or mono-methacrylates of ethylene glycol, 1,2 propylene glycol and 1,4 butylene glycol, such as 2-hydroxy ethyl methacrylate, monoacrylates or mono-methacrylates of poly-1,2-propylene glycol having 2–4 of degree of polymerization, and the like.

The monomers having the general formula of

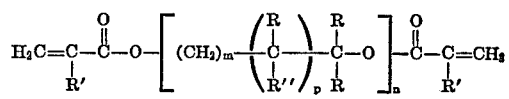

used in the present invention, in which R represents hydrogen, —$CH_3$, —$C_2H_5$, —$CH_2OH$, or

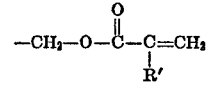

$R'$ represents hydrogen, chlorine, methyl, or ethyl radicals, $R''$ represents hydrogen, —OH, or

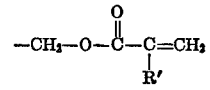

$m$ represents an integer of 1–8, $n$ represents an integer of 1–20, and $p$ represents 0 or 1, are di-ethylene glycol di-methacrylate, tri-ethylene glycol di-acrylate, tri-ethylene glycol di-methacrylate, tetra-ethylene glycol di-methacrylate, 1,2-propylene glycol di-methacrylate, di-propylene glycol di-methacrylate, polyethylene glycol di-methacrylate, di-(penta-methylene glycol)-di-methacrylate, tetra-ethylene glycol di-acrylate, tetra-ethylene glycol di-(chloro-acrylate), di-glycerol di-acrylate, glycerin tri-methacrylate, tri-methylol propane tri-methacrylate, di-glycerol tetra-methacrylate, di-methacrylate bis (ethylene glycol) phthalate, and the like.

Ortho-sulfo benzoic acid imide used in the present invention is a compound having the following constructural formula

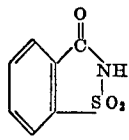

or sodium salt thereof.

The mercaptans used in the present invention are methyl mercaptan, ethyl mercaptan, propyl mercaptan, isopropyl mercaptan, n-butyl mercaptan, allyl mercaptan, n-dodecyl mercaptan, thioglycollic acid, 2-mercapto ethanol, benzyl mercaptan, and the like.

Ortho-sulfo benzoic acid imide and mercaptans used in the present invention must be added to 100 parts by weight of monomers, with the amounts of 0.01–4.0 parts by weight of the ortho-sulfo benzoic acid amide and 0.01–10.0 by weight of the mercaptans, preferably with the amounts of 0.5–1.0 part by weight of the ortho-sulfobenzoic acid imide and 0.1–3.0 parts by weight of the mercaptans, to impart an excellent anaerobic curable characteristic to the monomers.

The treated monomers containing below 0.01 part by weight of ortho-sulfobenzoic acid imide and below 0.01 part by weight of mercaptans, respectively, are extremely low or zero in sticking force, because they scarcely or never have an anaerobic curable characteristic.

The treated monomers containing over 4.0 parts by weight of ortho-sulfo benzoic acid imide are inferior in storage stability, and furthermore, the treated monomers containing over 10.0 parts by weight of mercaptans are extremely low in sticking force, because they are plasticized by the mercaptans.

The details of the present invention will be more evident from the following examples and references.

In the examples and references, all parts are meant by parts by weight.

EXAMPLES 1–9

1.0 part of ortho-sulfo benzoic acid imide and 0.5 part of n-dodecyl mercaptan were added to each of 100 parts of the monomers described in Table I. The mixtures thus produced were stirred and dissolved to obtain treated monomers.

The screws of soft steel bolts were coated with the treated monomers thus obtained. Nuts having a thickness of 8 mm. were tightened by hand on the coated bolts. They were allowed to stand in the atmosphere at a temperature of 25° C.

When the treated monomers were coated on the bolts, they were kept in the state of liquid by the reason that they were in a contact with air, but when the bolts were tightened with the nuts, the treaed monomers were cured because of exclusion of air.

The anaerobic curing velocities of the treated monomers were represented by determining the starting time of the curing, and the sticking forces of the treated monomers were represented by determining the prevailing torque after the various standing periods, and the results were shown in the Table I.

TABLE I

| Example number | Monomers | Starting time of curing, min. | Prevailing torque (kg.-cm.) | | | | Gel time (storage stability), min. (80° C.) |
|---|---|---|---|---|---|---|---|
| | | | 10 min. | 30 min. | 60 min. | 24 hrs. | |
| 1 | Tri-methylol propane trimethacrylate | 6 | 15 | 55 | 120 | 380 | 70 |
| 2 | Tetra-ethylene glycol dimethacrylate | 5 | 10 | 60 | 146 | 272 | 50 |
| 3 | Tri-ethylene glycol dimethacrylate | 5 | 8 | 45 | 100 | 210 | 55 |
| 4 | 2-hydroxy ehyl methacrylate | 8 | 5 | 25 | 70 | 230 | 120 |
| 5 | Glycerin tri-methacrylate | 6 | 15 | 60 | 125 | 370 | 85 |
| 6 | Tri-ethylene glycol diacrylate | 7 | 10 | 50 | 110 | 355 | 40 |
| 7 | Di-ethylene glycol dimethacrylate | 6 | 10 | 55 | 90 | 310 | 50 |
| 8 | Di-methacrylate bis (ethylene glycol) phthalate | 4 | 15 | 60 | 115 | 300 | 50 |
| 9 | 1,2-propylene glycol dimethacrylate | 7 | 8 | 40 | 90 | 285 | 60 |

The results described in the Table I were illustrated, for example, with the result of the Example No. 1 as follows. When the bolt was loosened after a six-minute lapse from the time that the nut was tightened on the bolt, resistance was encountered. This indicates that the treated monomer coated on the bolt was cured. Furthermore, the prevailing torques after the lapse of 10 minutes, 30 minutes, 60 minutes, and 24 hours were 15, 55, 120 and 380 (kg.-cm.), respectively, which are determined with torque wrench.

It is obvious from the results that the treated monomer has rapidly anaerobic curing velocity and highly sticking force.

The aforementioned treated monomers were then sampled in test tubes, and the test tubes were maintained at a temperature of 80° C. Thus, gel times of the treated monomers were determined. The gel times indicate the storage stability of the treated monomers; that is, when the gel times are more than 30 minutes, it means that the storage stabilities of the treated monomers are more than six months at a room temperature, and, moreover, it means that the storage stabilities thereof are excellent.

The times required for gelling the aforementioned each sample are described in the Table I, and it is obvious from the Table I that all samples have excellent storage stabilization.

Furthermore, it is obvious from the aforementioned results that all of said treated monomers have rapidly anaerobic curing velocity, highly sticking property and excellent storage stabilization.

EXAMPLES 10–16

Each of 0.5 part of mercaptans described in Table II and 1.0 part of ortho-sulfo benzoic acid imide were added to 100 parts of tri-methylol propane tri-methacrylate, and the mixtures thus produced were stirred and dissolved to obtain treated monomers.

Each of the treated monomers thus obtained was tested to obtain starting time of curing, prevailing torque and gel time by the method described in the Example Nos. 1–9, and the results were shown in the Table II.

TABLE II

| Ex. No. | Mercaptans | Starting time of curing, min. | Prevailing torque after the lapse of 24 hrs. | Gel time (storage stability), min. (80° C.) |
|---|---|---|---|---|
| 10 | n-Dodecyl mercaptan | 6 | 380 | 70 |
| 11 | Thioglycollic acid | 18 | 350 | 80 |
| 12 | n-Butyl mercaptan | 15 | 340 | 120 |
| 13 | 2-mercapto-ethanol | 8 | 370 | 75 |
| 14 | Propyl mercaptan | 9 | 360 | 90 |
| 15 | Aryl mercaptan | 10 | 345 | 100 |
| 16 | Benzyl mercaptan | 14 | 375 | 95 |

The results described in the Table II were illustrated, for example, with the Example No. 10 as follows:

The treated monomer, which is produced by adding 1.0 part of ortho-sulfo benzoic acid imide and 0.5 part of n-dodecyl mercaptan to 100 parts of tri-methylol propane tri-methacrylate, required six minutes for starting anaerobic curing, showed 380 kg.-cm. of prevailing torque after the lapse of 24 hours of standing time, and required 70 minutes for gelling.

It is obvious from the above-described results that the treated monomers have rapidly anaerobic curing velocity, highly sticking property, and excellent storage stabilization.

EXAMPLES 17–20

Ortho-sulfo benzoic acid imide and n-dodecyl mercaptan were added to 100 parts of tri-methylol propane tri-methacrylate respectively with the amounts indicated in Table III, and the mixtures thus produced were stirred and dissolved to obtain treated monomers.

Each of the treated monomers thus obtained was tested to obtain the staring time of curing, prevailing torque, and gel time by the method described in the Examples 1–9, and the results were shown in the Table III.

TABLE III

| Ex. No. | The amounts of— | | Starting time of curing (min.) | Prevailing torque after the lapse of 24 hrs. (kg.-cm.) | Gel time (storage stability), min. (80° C.) |
|---|---|---|---|---|---|
| | Ortho-sulfo benzoic acid imide (parts) | n-Dodecyl mercaptan (parts) | | | |
| 17 | 0.01 | 2.00 | 30 | 180 | 170 |
| 18 | 4.00 | 2.00 | 4 | 420 | 36 |
| 19 | 2.00 | 0.01 | 7 | 330 | 50 |
| 20 | 2.00 | 10.00 | 6 | 390 | 55 |

The treated monomer indicated in Example No. 17, which contains 0.01 part of ortho-sulfo benzoic acide imide, required 30 minutes for starting anaerobic curing, showed 180 kg.-cm. of prevailing torque after the lapse of 24 hours of standing time, and required 170 minutes for gelling.

The treated monomer indicated in Example No. 18, which contains 4.0 parts of ortho-sulfo benzoic acid imide, required 4 minutes for starting anaerobic curing, showed 420 kg.-cm. of prevailing torque after the lapse of 24 hours of standing time, and required 36 minutes for gelling.

The treated monomer indicated in Example No. 19, which contains 0.01 part of n-dodecyl mercaptan, required 7 minutes for starting anaerobic curing, showed 330 kg.-cm. of prevailing torque after the lapse of 24 hours of standing time, and required 50 minutes for gelling.

The treated monomer indicated in Example No. 20, which contains 10.0 parts of n-dodecyl mercaptans, required 6 minutes for starting anaerobic curing, showed 390 kg.-cm. of prevailing torque after the lapse of 24 hours of standing time, and required 55 minutes for gelling.

It is obvious from the above-described results that said treated monomers have a rapidly anaerobic curing velocity, a highly sticking property, and an excellent storage stability.

REFERENCE A

Ortho-sulfo benzoic acid imide and n-dodecyl mercaptan were added to 100 parts of tri-methylol propane tri-methacrylate with respectively the amounts described in Table IV, and the mixtures thus produced were stirred and dissolved to obtain treated monomers.

Each of the treated monomers thus obtained was tested to obtain starting time of curing, prevailing torque and gel time, by the method described in Examples 1–9, and the results were shown in Table IV.

TABLE IV

| Ex. No. | The amounts of— | | Starting time of curing (min.) | Prevailing torque after the lapse of 24 hrs. (kg.-cm.) | Gel time (storage stability), min. (80° C.) |
|---|---|---|---|---|---|
| | Ortho-sulfo benzoic acid imide (parts) | n-Dodecyl mercaptan (parts) | | | |
| 1 | 0 | 2.00 | (¹) | 0 | >180 |
| 2 | 0.005 | 2.00 | 180 | 20 | 170 |
| 3 | 6.00 | 2.00 | 4 | 420 | 8 |
| 4 | 2.00 | 0 | (¹) | 0 | 55 |
| 5 | 2.00 | 0.005 | 160 | 18 | 60 |
| 6 | 2.00 | 12 | 7 | 10 | 65 |

¹ Not curing.

Both sample No. 1, which does not contain ortho-sulfo benzoic acid imide, and the sample No. 4, which does not contain n-dodecyl mercaptan, described in the Table IV, did not cure after lapse of 24 hours, and were zero in prevailing torque.

Both of the sample No. 2, which contains below 0.01 part of ortho-sulfo benzoic acid imide, and the sample No. 5, which contains below 0.01 part of n-dodecyl mercaptan, described in the Table IV, required long periods for starting the curing, and were extremely low in prevailing torque after the lapse of 24 hours.

Thus, it is obvious from the above-mentioned results that all of these samples show slow anaerobic curing velocity, and low sticking property.

The sample No. 3, which contains over 4.0 parts of ortho-sulfo benzoic acid imide, described in the Table IV, was extremely inferior in storage stabilization.

The sample No. 6, which contains over 10.0 parts of n-dodecyl mercaptan, was extremely low in prevailing torque. This means that the sample 16 is inferior in sticking property.

REFERENCE B 0.3 part of cumene hydro-peroxide was added to 100 parts of tri-methylol propane tri-methacrylate, and the mixture thus produced was stirred and dissolved. Thus, the treated monomer No. 1 was obtained.

Furthermore, 0.3 part of cumene hydro-peroxide was added to 100 parts of tetra-ethylene glycol di-methacrylate, and the mixture thus produced was stirred and dissolved. Thus, the treated monomer No. 2 was obtained.

Furthermore, 0.3 part of cumene hydro-peroxide was added to 100 parts of 2-hydroxy ethyl methacrylate, and the mixture thus produced was stirred and dissolved. Thus, the treated monomer No. 3 was obtained.

The aforementioned examples, thus obtained, were tested to determine the starting time of curing, the prevailing torque, and the gel time, and the results were compared with the data determined by the examples of the present invention. The comparison was carried out in Table V.

TABLE V

| Treated monomers | Starting time of curing, min. | Prevailing torque (kg.-cm.) | | | | | | | | Gel time (storage stability), min. (80° C.) |
|---|---|---|---|---|---|---|---|---|---|---|
| | | 10 min. | 20 min. | 30 min. | 1 hr. | 2 hrs. | 3 hrs. | 10 hrs. | 24 hrs. | |
| Treated monomer No. 1 (100 parts of tri-methylol propane tri-methacrylate plus 0.3 part of cumene hydro-peroxide) | 420 | 0 | 0 | 0 | 0 | 0 | 0 | 5 | 18 | 160 |
| The treated monomer obtained by the Example No. 1 of the present invention | 6 | 15 | 40 | 55 | 120 | 150 | 250 | 320 | 380 | 70 |
| Treated monomer No. 2 (100 parts of tetraethylene glycol di-methacrylate plus 0.3 part of cumene hydro-peroxide) | 160 | 0 | 0 | 0 | 0 | 0 | 5 | 105 | 235 | 50 |
| The treated monomer obtained by the Example No. 2 of the present invention | 5 | 10 | 39 | 60 | 116 | 160 | 190 | 246 | 272 | 50 |
| Treated monomer No. 3 (100 parts of 2-hydroxy ethyl methacrylate plus 0.3 part of cumene hydro-peroxide) | 70 | 0 | 0 | 0 | 0 | 10 | 80 | 185 | 230 | 35 |
| The treated monomer obtained by the Example No. 4 of the present invention | 8 | 5 | 10 | 25 | 70 | 96 | 137 | 215 | 390 | 120 |

It is obvious from the Table V that all of the aforementioned treated monomers, that is the treated monomer No. 1, No. 2, and No. 3, produced by the Reference B, require longer time for starting the curing, and are lower in the prevailing torque, than those of the treated monomers obtained by the examples of the present invention.

Therefore, it is also obvious from the Table V that all of the treated monomer No. 1, No. 2, and No. 3, containing cumene hydroperoxide, were lower in anaerobic curing velocity and sticking force.

We claim:

1. A method of imparting an anaerobic curable characteristic to a polymerizable monomer, which comprises adding in the presence of oxygen 0.01–4.0 parts by weight of a compound taken from the group consisting of ortho-sulfo benzoic acid imide and the sodium salt of ortho-sulfo benzoic acid imide and 0.01–10.0 parts by weight of a mercaptan to 100 parts by weight of a polymerizable monomer taken from the group consisting of a monomer having the general formula of

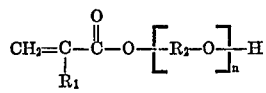

in which $R_1$ represents hydrogen or methyl radical, $R_2$ represents ethylene, propylene, or butylene radicals, and $n$ represents an integer of 1–10, and a monomer having the general formula of

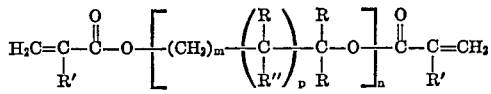

in which R represents hydrogen, —$CH_3$, $C_2H_5$, —$CH_2OH$ or

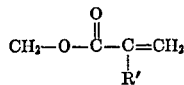

R' represents hydrogen, chlorine, methyl, or ethyl radicals, R'' represents hydrogen, —OH, or

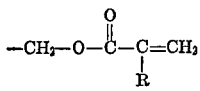

$m$ represents an integer of 1–8, $n$ represents an integer of 1–20, and $p$ represents 0 or 1.

2. A method as defined in claim 1 whereby ortho-sulfo benzoic acid imide is added.

3. A method as defined in claim 1 whereby the sodium salt of ortho-sulfo benzoic acid imide is added.

4. A method as defined in claim 1, wherein the mercaptan is a n-dodecyl mercaptan.

5. A method as defined in claim 1, wherein the mercaptan is a thio-glycollic acid.

6. A method as defined in claim 1, wherein the mercaptan is n-butyl mercaptan.

7. A method as defined in claim 1, wherein the mercaptan is n-mercapto ethanol.

8. A method as defined in claim 1, wherein the mercaptan is a propyl mercaptan.

9. A method as defined in claim 1, wherein the mercaptan is an allyl mercaptan.

10. A method as defined in claim 1, wherein the mercaptan is a benzyl mercaptan.

11. A method as defined in claim 1, wherein the polymerizable monomer is a tri-methylol propane tri-methacrylate.

12. A method as defined in claim 1, wherein the polymerizable monomer is a tetra-ethylene glycol di-methacrylate.

13. A method as defined in claim 1, wherein the polymerizable monomer is tri-ethylene glycol dimethacrylate.

14. A method as defined in claim 1, wherein the polymerizable monomer is 2-hydroxy ethyl methacrylate.

15. A method as defined in claim 1, wherein the polymerizable monomer is glycerin tri-methacrylate.

16. A method as defined in claim 1, wherein the polymerizable monomer is tri-ethylene glycol di-acrylate.

17. A method as defined in claim 1, wherein the polymerizable monomer is di-ethylene glycol di-methacrylate.

18. A method as defined in claim 1, wherein the polymerizable monomer is di-methacrylate bis(ethylene glycol) phthalate.

19. A method as defined in claim 1, wherein the polymerizable monomer is 1,2-propylene glycol di-methacrylate.

20. A method as defined in claim 1, wherein the polymerizable monomer shown by the general formula of

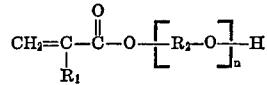

in which $R_1$ represents hydrogen or methyl radical, $R_2$ represents ethylene, propylene, or butylene radicals, and $n$ represents an integer of 1–10.

21. A method as defined in claim 1, wherein the polymerizable monomer shown by the general formula of

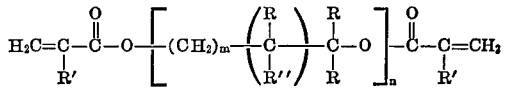

in which R represents hydrogen, —$CH_3$, —$C_2H_5$, —$CH_2OH$, or

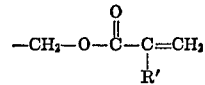

R' represents hydrogen, chlorine, methyl or ethyl radicals, R'' represents hydrogen, —OH, or

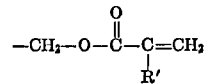

$m$ represents an integer of 1–8, $n$ represents an integer of 1–20, and $p$ represents 0 or 1.

22. A method as defined in claim 1, wherein 0.5–1.0 parts by weight of the ortho-sulfo benzoic acid imide is added to 100 parts by weight of the polymermizable monomer.

23. A method as defined in claim 1, wherein 0.1–3.0 parts by weight of the mercaptan is added to 100 parts by weight of the polymerizable monomer.

24. A method as described in claim 1, wherein the mercaptan is a mixture containing at least two compounds selected from the group consisting of methyl mercaptan, ethyl mercaptan, isopropyl mercaptan, n-dodecyl mercaptan, thio-glycollic acid, n-butyl mercaptan, n-mercapto ethanol, propyl mercaptan, allyl mercaptan and benzyl mercaptan.

25. A polymerizable monomeric composition adapted to be cured anaerobically comprising 0.01–4.0 parts by weight of a compound taken from the group consisting of ortho-sulfo benzoic acid imide and the sodium salt of ortho-sulfo benzoic acid imide and 0.01–10.0 parts by weight of a mercaptan to 100 parts by weight of a polymerizable monomer taken from the group consisting of a monomer having the general formula of

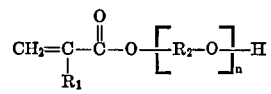

in which $R_1$ represents hydrogen or methyl radical, $R_2$ represents ethylene, propylene, or butylene radicals, and $n$ represents an integer of 1–10, and a monomer having the general formula of

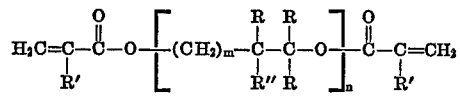

in which R represents hydrogen, $-CH_3$, $C_2H_5$, $-CH_2OH$ or

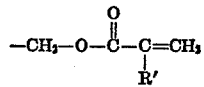

R' represents hydrogen, chlorine, methyl, or ethyl radicals, R'' represents hydrogen, $-OH$, or

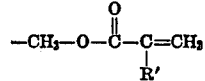

$m$ represents an integer of 1–8, $n$ represents an integer of 1–20, and $p$ represents 0 or 1.

References Cited
UNITED STATES PATENTS
3,397,189   8/1968   Erickson et al. _____ 260—79

DONALD E. CZAJA, Primary Examiner
M. I. MARQUIS, Assistant Examiner

U.S. Cl. X.R.
161—187, 213; 260—79.5 C, 88.3 A, 89.5 A

PO-1050
(5/69)

UNITED STATES PATENT OFFICE
CERTIFICATE OF CORRECTION

Patent No. 3,775,385      Dated November 27, 1973

Inventor(s) MASAYOSHI OZONO and MASAKATSU SUZUKI

It is certified that error appears in the above-identified patent and that said Letters Patent are hereby corrected as shown below:

Col. 1, line 42    "comprising" should read --comprises--

Col. 3, line 43    "amide" should read --imide--
        line 44    insert "parts" after 10.0

Col. 4, line 4    "treaed" should read --treated--
        Table I    "85" should read --80--
        Example 5
        Table I    "40" should read --45--
        Example 6

Col. 5, line 22    "staring" should read --starting--
        line 36    "acide" should read --acid--
        line 53    "mercaptans" should read --mercaptan--

Col. 7, line 48    "R" should read --R'--

Signed and sealed this 17th day of December 1974.

(SEAL)
Attest:

McCOY M. GIBSON JR.            C. MARSHALL DANN
Attesting Officer             Commissioner of Patents